(12) United States Patent
Hu et al.

(10) Patent No.: US 7,597,988 B2
(45) Date of Patent: Oct. 6, 2009

(54) INTEGRATED END-BUS PLATE FOR FUEL CELL

(75) Inventors: Liqing Hu, Shanghai (CN); Zheng Li, Shanghai (CN); Weiliang Guo, Shanghai (CN)

(73) Assignee: Shen-Li High Tech Co., Ltd., Shanghai (CN)

( * ) Notice: Subject to any disclaimer, the term of this patent is extended or adjusted under 35 U.S.C. 154(b) by 927 days.

(21) Appl. No.: 11/027,534

(22) Filed: Dec. 29, 2004

(65) Prior Publication Data

US 2006/0141319 A1    Jun. 29, 2006

(51) Int. Cl.
*H01M 8/02* (2006.01)
*B32B 15/04* (2006.01)

(52) U.S. Cl. .......................... 429/38; 428/458
(58) Field of Classification Search ............... 429/34, 429/38, 39; 428/458
See application file for complete search history.

(56) References Cited

U.S. PATENT DOCUMENTS

| | | | |
|---|---|---|---|
| 6,001,502 A * | 12/1999 | Walsh | 429/34 |
| 6,599,619 B1 * | 7/2003 | Lane et al. | 428/458 X |
| 6,942,941 B2 * | 9/2005 | Blunk et al. | 429/36 |
| 2004/0131917 A1 * | 7/2004 | Mazza et al. | 429/38 |

* cited by examiner

*Primary Examiner*—Stephen J. Kalafut
(74) *Attorney, Agent, or Firm*—Raymond Y. Chan; David and Raymond Patent Firm

(57) ABSTRACT

An integrated end-bus plate for fuel cell stack includes main plate body and a conducting plate. The main plate body is made of corrosion resistant and non-conducting material, which inner side has at least a contacting surface provided for flatly in contact with one side of the fuel cell unit attached adjacent to the main plate body. The conducting plate which is made of electro-conducting material is integrally attached to an inner side of the main plate body to form an integrated body for electrically communicating with the reaction region of the fuel cell unit. The integrated end-bus plate is designed to overcome the conventional drawbacks including the fluid leaking between the end plate and the bus plate and the formation of metallic ions due to the electrochemical corrosion of the bus plate that generally results in causing damages to the fuel cell.

16 Claims, 8 Drawing Sheets

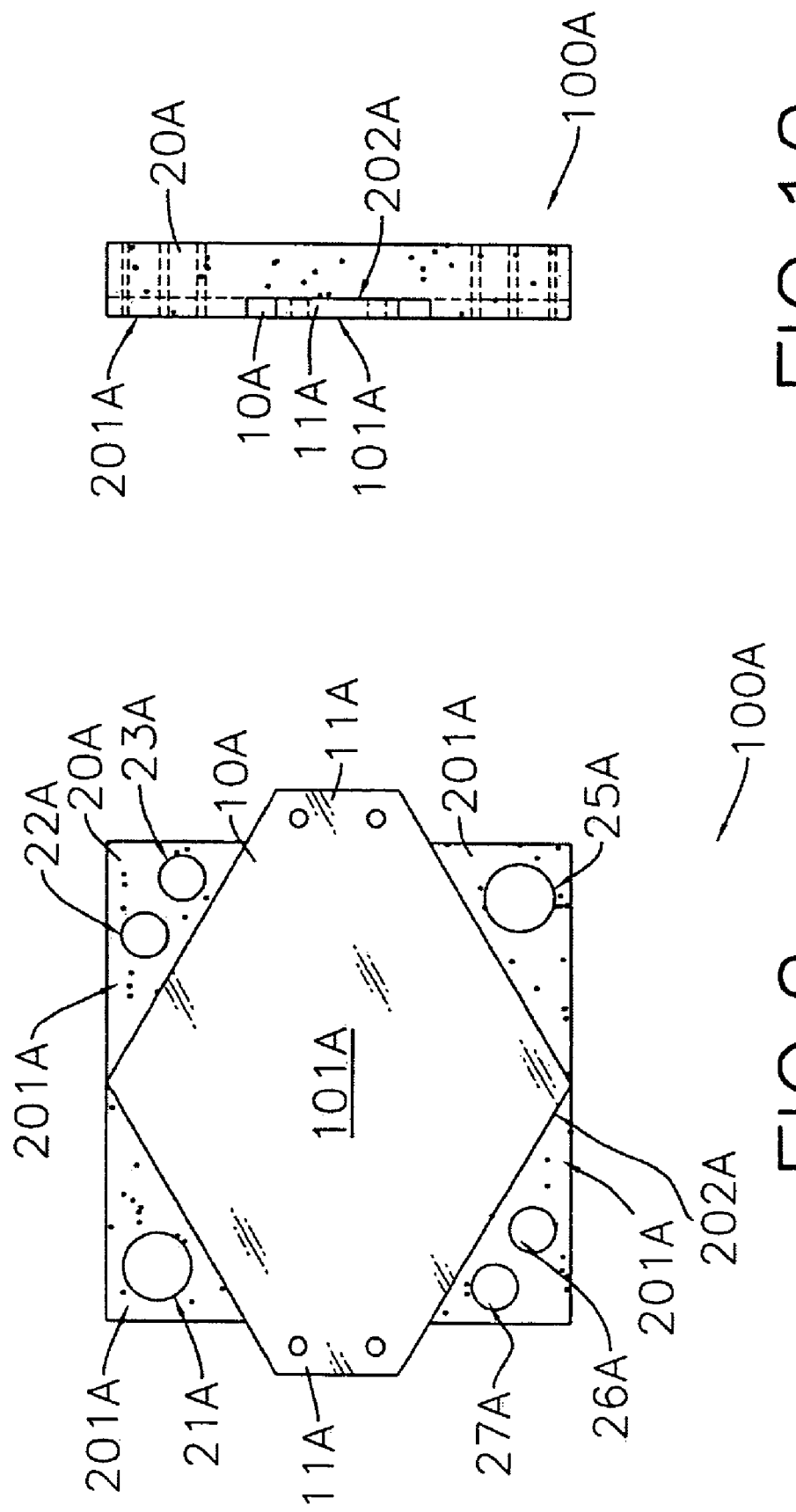

INTEGRATED END-BUS PLATE FOR FUEL CELL

BACKGROUND OF THE PRESENT INVENTION

1. Field of Invention

The present invention relates to fuel cell, and more particularly to an integrated end-bus plate which provides electrical conduction and manifolds for fluid flowing in one body for a fuel cell stack so as to prevent fluid leaking between the end plate and the bus plate and the formation of metallic ions due to the electrochemical corrosion of the bus plate that generally results in causing damages to the fuel cell.

2. Description of Related Arts

Electrochemical fuel cell is a kind of electrochemical energy conversion device which is capable of converting hydrogen and oxidant into electrical energy. Proton exchange membrane fuel cell can be used as the power supply system of transportation tools, such as land and water vehicles, or a mobile or stationary electric generator.

The core element of the proton exchange membrane fuel cell system is the membrane electrode assembly (MEA) which comprises a proton exchange membrane sandwiched between two porous sheets made of conductive material, such as carbon tissue. In the typical proton exchange membrane fuel cell system, the MEA is disposed between two electrical conducting electrode plates, wherein the contacting interface of each electrode plate provides one or more flowing channels for respectively directing fuel and oxidant into anode side and cathode side which are positioned on opposite sides of the MEA. For a single fuel cell, only one MEA is provided and disposed between an anode plate and a cathode plate. It is noted that the anode plate and the cathode plate are embodied not only as current-collecting device, but also as a supporting device for securely holding the MEA in position.

To increase the overall power output of a fuel cell system, a plurality of fuel cell units are electrically connected in series or in parallel to form a proton exchange membrane fuel cell stack. By incorporating such a proton exchange membrane fuel cell stack with other operation system can build a proton exchange membrane fuel cell power generator.

Referring to FIG. 1, a MEA of the fuel cell unit of the conventional proton exchange membrane fuel cell stack is illustrated, which provides an air inlet manifold $1a$, a water inlet manifold $2a$, a hydrogen inlet manifold $3a$, a reaction region $4a$, an air outlet manifold $5a$, a water outlet manifold $6a$, and a hydrogen outlet manifold $7a$ therein. Referring to FIG. 2, an electrode plate of the fuel cell unit of the conventional proton exchange membrane fuel cell stack is illustrated, which provides an air inlet manifold $1b$, a water inlet manifold $2b$, a hydrogen inlet manifold $3b$, an air outlet manifold $5b$, a water outlet manifold $6b$, a hydrogen outlet manifold $7b$, and a fluid flowing channel $8b$ therein.

Referring to FIG. 3, a fuel cell stack comprising a plurality of fuel cell units stacked in series is illustrated, which includes two end plates $9a$, a first bus plate $10a$, a second bus plate $12a$, a plurality of fuel cell units $11a$ stacked between the first and second bus plates $10a$, $12a$, and a power load $13a$ electrically connected between the first and second bus plates $10a$, $12a$.

FIG. 4 illustrates a proton exchange membrane fuel cell stack which includes a plurality of sets of fuel cell stack electrically connected in parallel with a power load, wherein each set of fuel cell stack comprises a first bus plate $10b$, a second bus plate $12b$, and a plurality of fuel cell units $11b$ stacked between the first and second bus plates $10b$, $12b$. In addition, the proton exchange membrane fuel cell stack further include a plurality of insulation plates $14b$ each of which is sandwiched between the bus plates $10b$, $12b$ of two sets of fuel cell stack.

Each type of fuel cell stacks as shown in FIGS. 3 and 4 consist of two or more bus plates functioning as anode and cathode of an external electric circuit and outputting an electric current from couple fuel cell units stacked in series or parallel manner or from a fuel cell stack to construct the electric circuit.

In addition, each of the bus plates has various fluid manifolds provided therein to enable various fuel cell fluids flowing therethrough. Referring to FIG. 5, the bus plate $10c$ as shown has fluid manifolds $1c$, $2c$, $3c$, $5c$, $6c$, and $7c$ and two current output terminals $15c$. Except the two current output terminals $15c$, the bus plate $10c$ substantially has the same size of the end plate of fuel cell stack while all fluid manifolds provided in the bus plate $10c$ have the same shape and size of that of the end plate so as to define various flowing passages of the whole fuel cell stack.

In order to achieve the above two features, the conventional bus plate of all kinds of fuel cell stack is made of noble metals such as gold, platinum or other metals such as stainless steel, copper or aluminum electroplated with gold or platinum. These noble metals not only have good conductibility but also can avoid electrochemical corrosion and thus will not produce any metallic ions that may cause damages to the fuel cell stack. However, these noble metals are very expensive. Even using stainless steel, copper or aluminum electroplated with gold or platinum is still relatively expensive and inconvenience.

If stainless steel, copper or aluminum is directly used to make the bus plate, electrochemical corrosion will occur when various fuel cell fluids passing through the fluid manifolds resulting in unwanted damages to the fuel cell stack due to the metallic ions produced.

SUMMARY OF THE PRESENT INVENTION

An objective of the present invention is to provide an integrated end-bus plate for fuel cell stack, which provides electrical conduction and manifolds for fluid flowing in one body for a fuel cell stack to overcome the conventional drawbacks including the fluid leaking between the end plate and the bus plate and the formation of metallic ions due to the electrochemical corrosion of the bus plate that generally results in causing damages to the fuel cell.

Another objective of the present invention is to provide an integrated end-bus plate for fuel cell stack, wherein the integrated end-bus plate functions as a bus plate to output electric current and an end plate to support the fuel cell units and accommodating the manifolds at the same time in one body.

Another objective of the present invention is to provide an integrated end-bus plate for fuel cell stack, wherein no sealing means, which is conventionally provided between the end plate and the bus plate, is required as in the conventional fuel cell stack.

In order to achieve the above objectives, the present invention provides an integrated end-bus plate for fuel cell stack having one or more fuel cell units each having a reaction region on each side thereof, comprising a main plate body and a conducting plate. The main plate body is made of corrosion resistant and non-conducting material having an outer side and an inner side, wherein the inner side has at least a contacting surface provided for flatly in contact with one side of the fuel cell unit attached adjacent to the main plate body, wherein the main plate body further provides a plurality of manifolds extended from the outer side to the contacting surface of the inner side thereof. The conducting plate which is made of electro-conducting material is integrally attached to the inner side of the main plate body to form an integrated body for electrically communicating with the reaction region of the fuel cell unit, which is positioned adjacent to the main plate body, while the contacting surface of the main plate body remains in contact with the respective adjacent fuel cell unit.

These and other objectives, features, and advantages of the present invention will become apparent from the following detailed description, the accompanying drawings, and the appended claims.

BRIEF DESCRIPTION OF THE DRAWINGS

FIG. 9 is an elevation view of an integrated end-bus plate according to a first alterative mode of the above preferred embodiment of the present invention.

FIG. 10 is an end view of the integrated end-bus plate according to the first alternative mode of the above preferred embodiment of the present invention.

DETAILED DESCRIPTION OF THE PREFERRED EMBODIMENT

Figure 1:
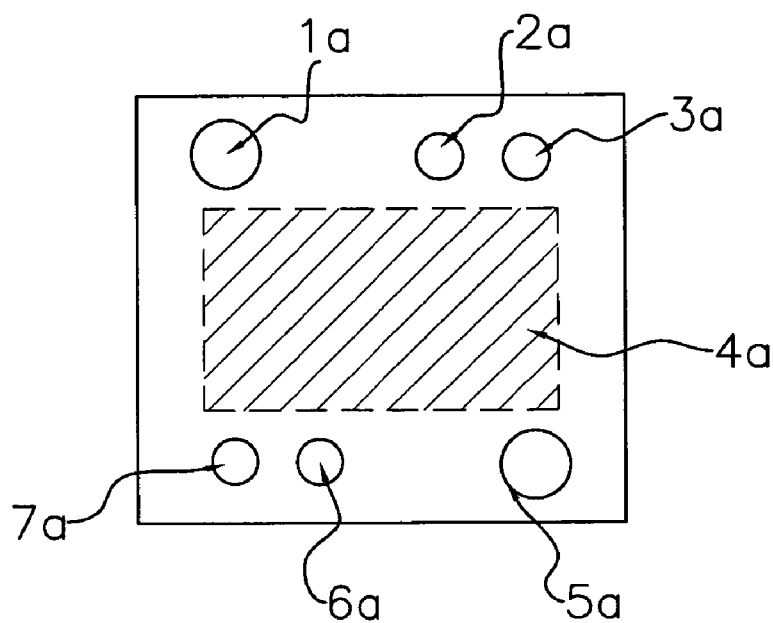
FIG. 1 is an elevation view of a MEA of a fuel cell unit of a fuel cell stack illustrating the reactant inlet and outlet manifolds provided in the upper and lower portions thereof.
Figure 2:
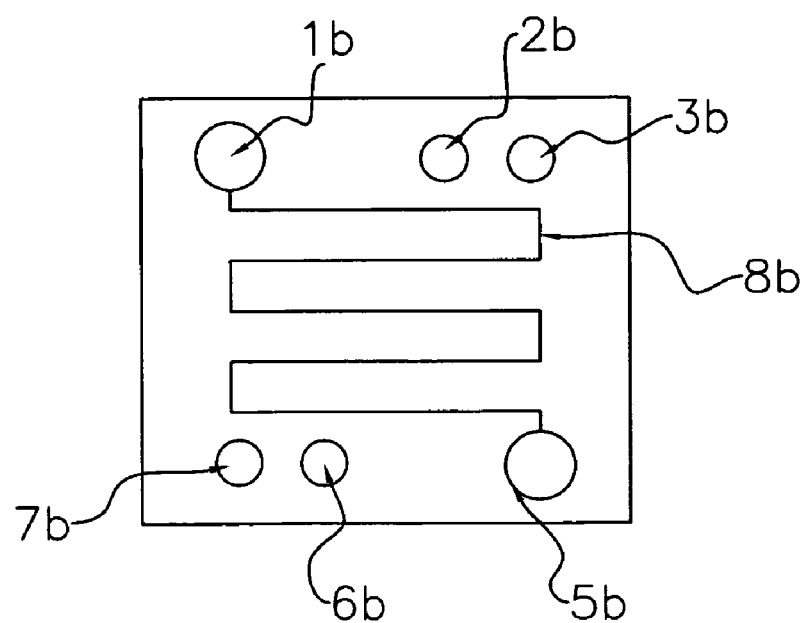
FIG. 2 is an elevation view of an electrode plate of a fuel cell unit of a fuel cell stack illustrating the reactant inlet and outlet manifolds provided in upper and lower portions thereof.
Figure 3:
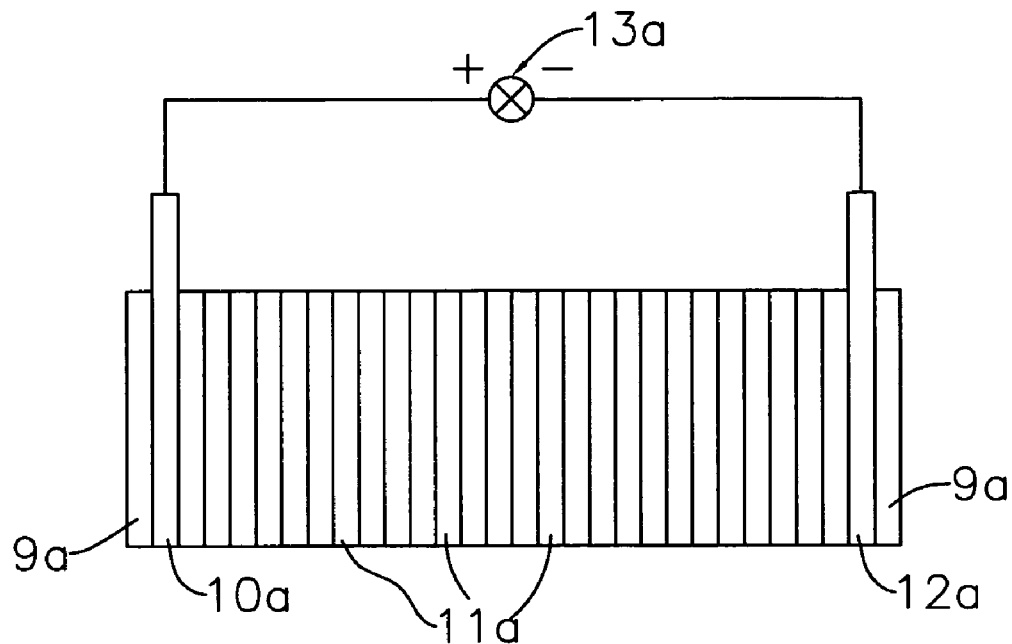
FIG. 3 is an elevation view of a kind of conventional fuel cell stack.
Figure 4:
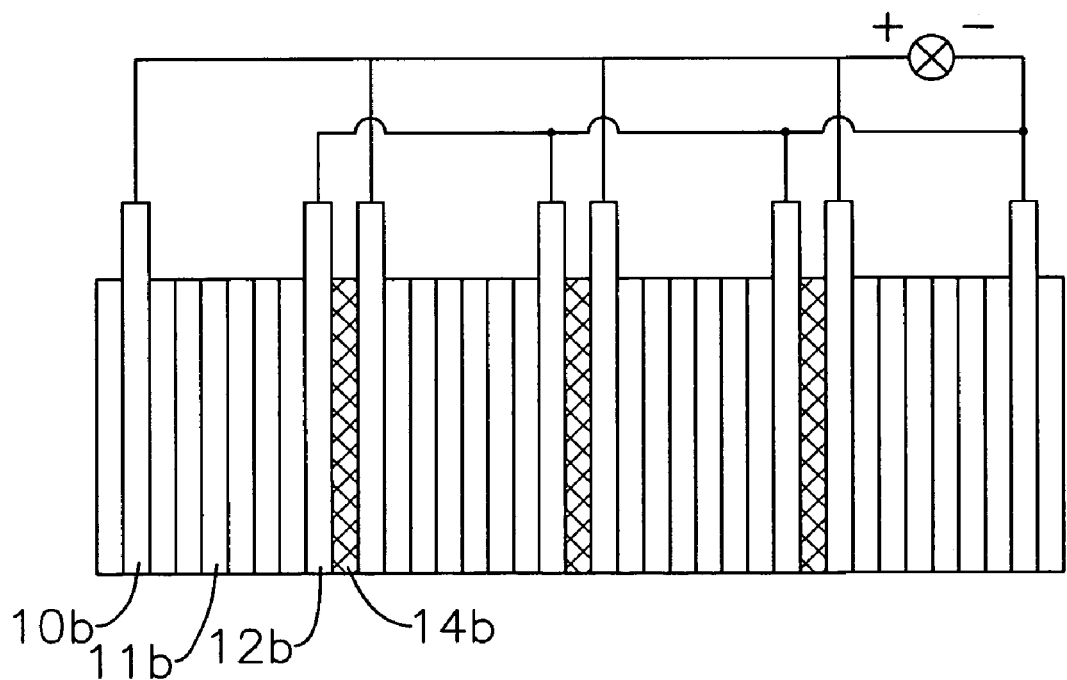
FIG. 4 is an elevation view of another kind of conventional fuel cell stack.
Figure 5:
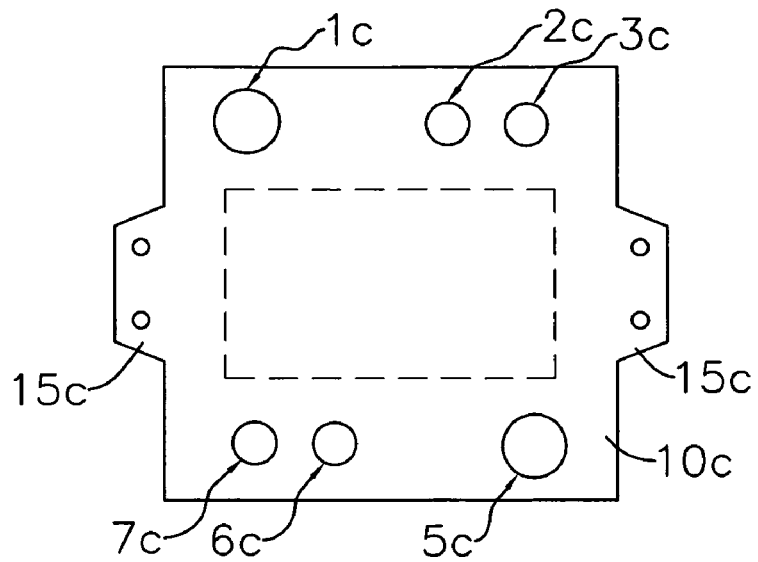
FIG. 5 is an elevation view of a conventional bus plate of the fuel cell stack illustrating the fluid manifolds provided in the upper and lower portions thereof.
Figure 6:
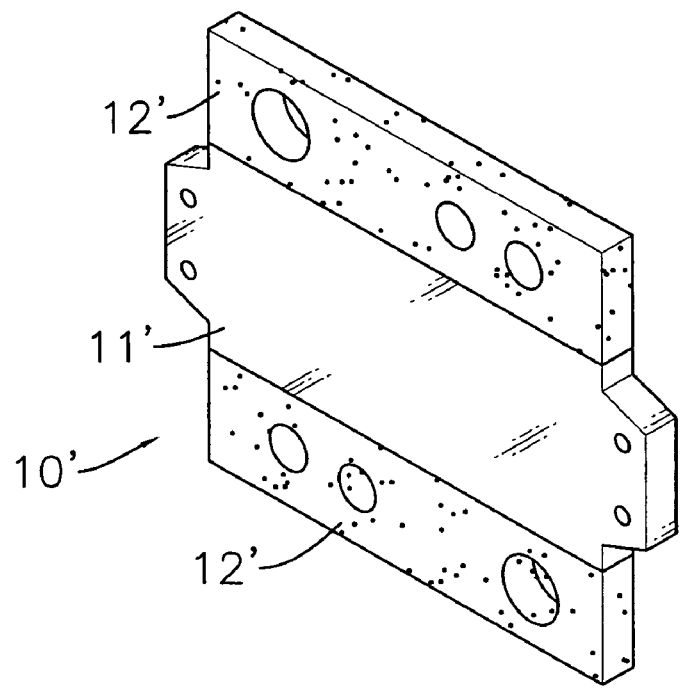
FIG. 6 is a perspective view of a combined bus plate according to the present invention.

In order to overcome the drawbacks of the conventional fuel cell stack, the applicant of the present invention develops an anti-corrosion combined bus plate 10' for fuel cell stack, as shown in FIG. 6, which is a cost effective and corrosion resisting bus plate made of two types of material. The bus plate 10' is divided into two sections, namely a conducting section 11' for electrochemical reaction and a non-conducting section 12' having the fluid manifolds provided therein, wherein the non-conducting section 12' is made of corrosion resistant and non-conducting material, such as plastic, epoxy resin, glass, and etc., and the conducting section 11' is made of materials having good conductibility such as aluminum, copper, zinc, titanium, and etc. The conducting section 11' and the non-conducting section 12' are adhered together to form an integral plate body having the same thickness in all regions, wherein sealing material can be used to insulate the non-conducting section 12' from the conducting section 11' so as to enable the fluids flowing therethrough from leaking to the conducting section 11'. In other words, the conducting section 11' can be absolutely sealed from the air and water media to avoid electrochemical corrosion. Or, even though corrosion occurs, the metallic ions will not leak into the fluid manifolds and pollute the fuel cell stack.

However, since the above combined bus plate 10' is constructed from more than one material to form different regions thereof, it is very troublesome and costly in manufacture. Moreover, during the assembly of the fuel cell stack, if there are inlet and outlet manifolds for fuel hydrogen, oxidant air and cooling fluid provided on the front and rear end plates of the fuel cell stack, rubber made sealing rings must be used between the end plate and the bus plate to ensure that the three kinds of fluid will not leak out between the bus plate and the end plate while the fluids are flowing through the fluid manifolds of the bus plate and the end plate. The arrangement of such sealing rings results in a more complicated structure for manufacture and these sealing rings are easily worn out after numbers of disassemble and reassemble operation.

Figure 8:
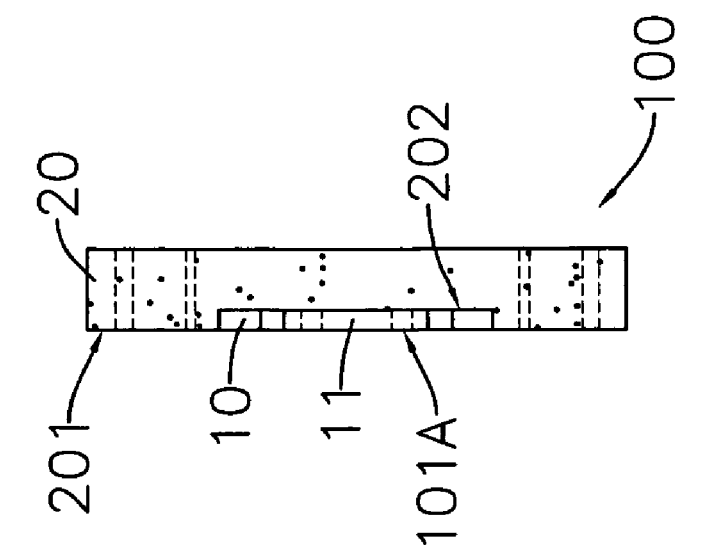
FIG. 8 is an end view of the integrated end-bus plate according to the above preferred embodiment of the present invention.
Figure 7:
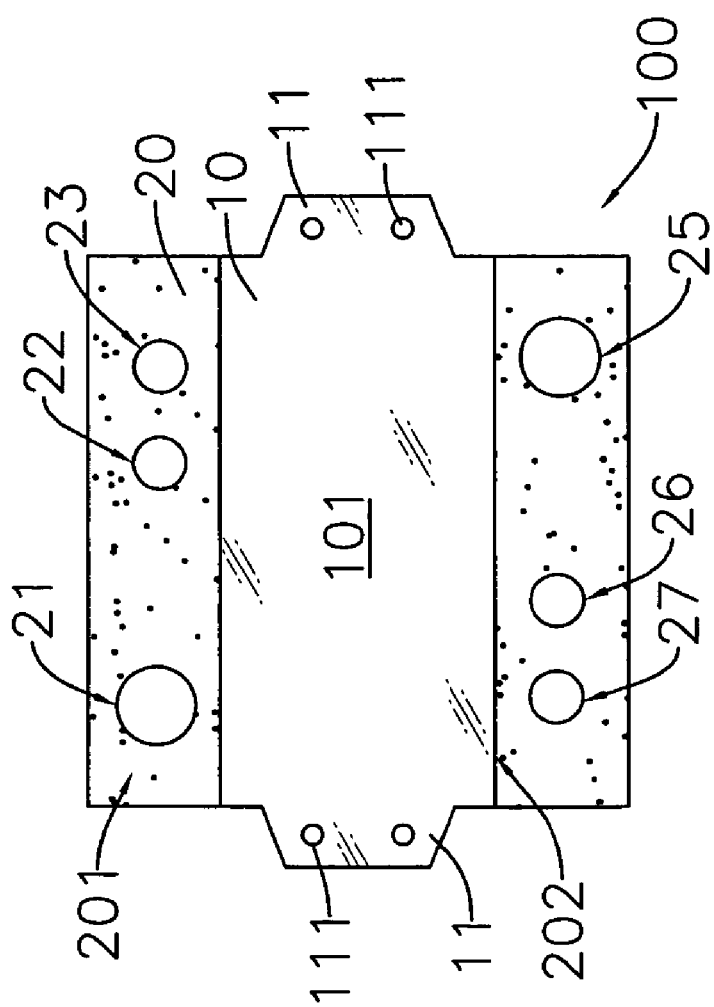
FIG. 7 is an elevation view of an integrated end-bus plate according to a preferred embodiment of the present invention.
Figure 14:
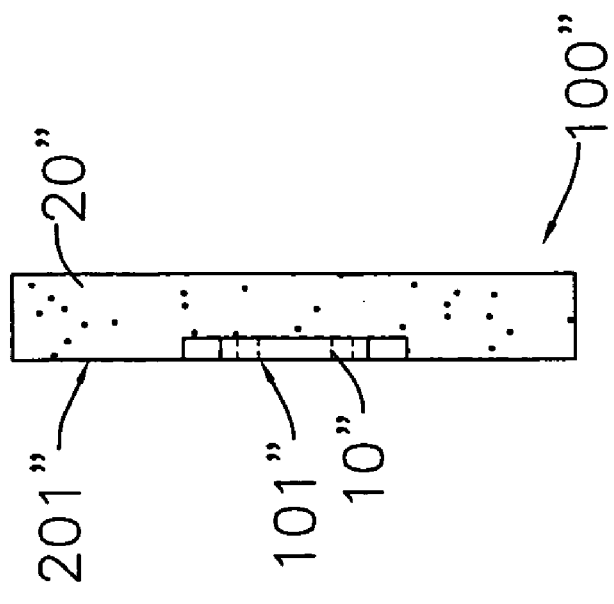
FIG. 14 is an end view of the integrated end-bus plate adapted for use as rear plate according to the preferred embodiment of the present invention.
Figure 15:
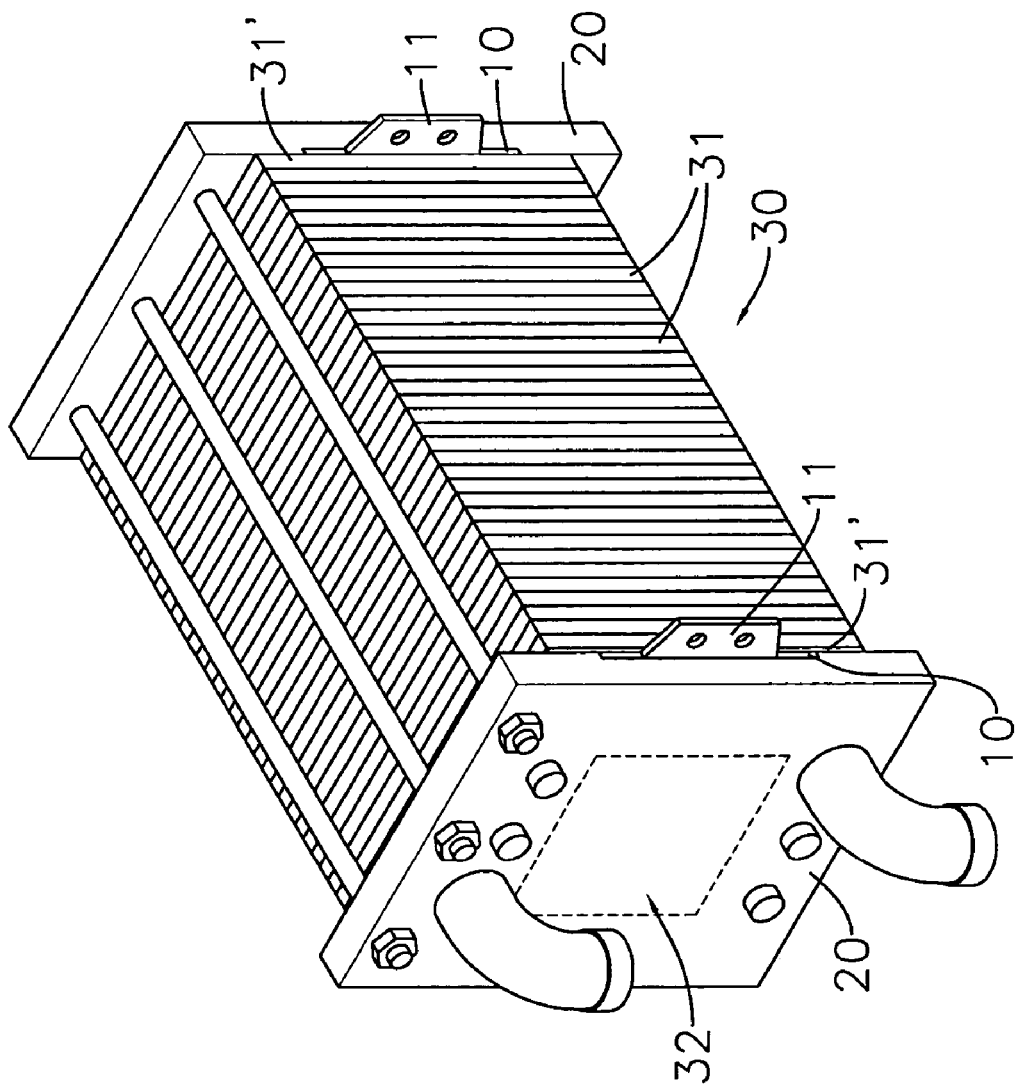
FIG. 15 is a perspective view of a fuel cell stack utilizing the integrated end-bus plate embodied in the above embodiments according to the present invention.

The present invention further overcomes such problems with the preferred embodiments as shown in FIGS. 7 to 15. Referring to FIGS. 7 and 8, an integrated end-bus plate 100 for a fuel cell stack 30, as shown in FIG. 15, having one or more fuel cell units 31 each having a reaction region 32 on each side thereof according to a preferred embodiment of the present invention is illustrated. The integrated end-bus plate 100 comprises a main plate body 20 and a conducting plate 10.

The main plate body 20 is made of corrosion resistant and electrical non-conducting material such as plastic, epoxy resin, ceramic, and etc. The main plate body 20 has an outer side and an inner side having at least a contacting surface 201 adapted for flatly in contact with one side of the fuel cell unit 31' attached adjacent to the main plate body 20, wherein the main plate body 20 further provides one or more manifolds 21, 22, 23, 25, 26, 27 extended from the outer side to the contacting surface 201 of the inner side of the main plate body 20.

The conducting plate 10 is made of electro-conducting material such as aluminum, copper, zinc, titanium, and etc. or metallic material electroplated with good electro-conducting noble metal such as gold and platinum. The conducting plate 10 is integrally attached to the inner side of the main plate body 20 to form an integrated body for electrically communicating with the reaction region 32 of the fuel cell unit 31' positioned adjacent to the main plate body 20 while the contacting surface 201 of the main plate body 20 remains in contact with the respective adjacent fuel cell unit 31'.

According to the first preferred embodiment, the main plate body 20 has a receiving groove 202 which is indented in a middle portion and extended from one end to the other end of the inner side thereof. The manifolds 21, 22, 23, 25, 26, and 27 are divided into two sets provided at an upper portion above the receiving groove 202 and a lower portion below the receiving groove 202 of the main plate body 20 respectively, wherein the manifolds 21, 22 and 23 are the air inlet manifold 21, the cooling fluid inlet manifold 22 and the hydrogen inlet manifold 23 and the manifolds 25, 26 and 27 are the air outlet manifold 25, the cooling fluid outlet manifold 26 and the hydrogen outlet manifold 27. The receiving groove 202 of the main plate body 20 is embodied as rectangular shape, for example 20 cm in length, 10 cm in width and 3 mm in depth.

The conducting plate 10, which has a corresponding size with respect to the receiving groove 202 of the main plate body 20, for example 20 cm in length, 10 cm in width and 2.9 mm in thickness, further comprises one or more electric terminal arms 11 extended outwardly from two ends thereof. Epoxy adhesive is applied to the inner surface and the upper and lower sides of the conduction plate 10 and then the conducting plate 10 is fittingly engaged in the receiving groove 202 to form an integral body which is heated to 80° C. for solidifying. Thereafter, the outer side of the main plate body 20 is ground until its contacting surface 201 and the conducting plate 10 are on the same plane to form the integrated end-bus plate 100 of the present invention.

Alternatively, the conducting plate 10 and the main plate body 20 can be integrated by means of an injection mold to form an integrated body which is further ground until its contacting surface 201 and the conducting plate 10 are on the same plane to form the integrated end-bus plate 100 of the present invention.

In other words, the depth of the receiving groove 202 of the main plate body 20 is substantially equal to the thickness of the conducting plate 10 to ensure a flat contact surface for the integrated end-bus plate 100 of the present invention, such that the outer surface of the conducting plate 10 forms a conducting surface 101 for electrically coupling with the adjacent fuel cell unit 31' while the air inlet manifold 21, the cooling fluid inlet manifold 22, the hydrogen inlet manifold 23, the air outlet manifold 25, the cooling fluid outlet manifold 26, and the hydrogen outlet manifold 27 of the main plate body 20 of the integrated end-bus plate 100 are respectively aligned with and shaped and sized as the air inlet manifold 1a, the water inlet manifold 2a, the hydrogen inlet manifold 3a, the air outlet manifold 5a, the water outlet manifold 6a, and the hydrogen outlet manifold 7a of the MEA and the air inlet manifold 1b, the water inlet manifold 2b, the hydrogen inlet manifold 3b, the air outlet manifold 5b, the water outlet manifold 6b, and the hydrogen outlet manifold 7b of the electrode plate of each of the fuel cell units 31 for directing fuel (hydrogen), oxidant (air) and coolant (water) respectively.

All the air inlet manifolds 21, 1a, 1b are coaxially aligned and sealedly connected to form an oxidant inlet passage. All the cooling fluid manifolds 22, 2a, 2b are coaxially aligned and sealedly connected to form a coolant inlet passage. All the hydrogen inlet manifolds 23, 3a, 3b are coaxially aligned and sealedly connected to form a fuel inlet passage. All the air outlet manifolds 25, 5a, 5b are coaxially aligned and sealedly connected to form an oxidant outlet passage. All the cooling fluid manifolds 26, 6a, 6b are coaxially aligned and sealedly connected to form a coolant outlet passage. All the hydrogen outlet manifolds 27, 7a, 7b are coaxially aligned and sealedly connected to form a fuel outlet passage.

The two electric terminal arms 11, each having one or more connection holes 111, function as an anode and a cathode of an external electric circuit and output electric current from the fuel cell units 31 stacked in series or parallel manner to construct the external electric circuit, as shown in FIGS. 7, 8 and 15.

According to the preferred embodiments, the integrated end-bus plate 100 of the present invention functions as a bus plate for the fuel cell units to collect electric current as well as an end plate of the fuel cell stack for mounting the fuel cell units to stack together to form the fuel cell stack as shown in FIG. 15, in which the end plates of the conventional fuel cell stack are eliminated in the present invention. In addition, conducting plate 10 embedded in the receiving groove 202 of the main plate body 20 has no manifold formed therein. Therefore, no fluid is required to flow through the conducting plate 10 which functions as the bus plate of the conventional fuel cell stack so that no leakage will happen to the integrated end-bus plate 100 of the present invention. At the same time, the thick main plate body 20, made of non-conducting and corrosion resistant material, is strong enough to support the mounting force for stacking the fuel cell units together between a pair of integrated end-bus plate 100 of the present invention and has no electrochemical corrosion occur in the manifolds formed in the main plate body 20. In other words, the manifolds 21, 22, 23, 25, 26, 27 formed on the upper and bottom portion of the main plate body 20 are functioned for manifolds extendibility and the conducting plate 10 embedded in the middle portion of the main plate body 20 is functioned for electrical current conductibility.

Since no fluid will flow between the main plate body 20 and the conducting plate 10 for the present invention, the integrated end-bus plate 100 of the present invention does not need to provide any sealing means to be positioned between the bus plate and the end plate like the conventional fuel cell stack.

Under the concept of the present invention, several alternative modes can be made to the preferred embodiment as described above. A first alternative mode is illustrated in FIGS. 9 and 10, wherein the rectangular shaped the receiving groove 202 of the preferred embodiment is substituted with a hexagonal shaped receiving groove 202A and, correspondingly, the conducting plate 10A is shaped and sized in hexagonal shape to integrally and fittingly embedded in the receiving groove 202A to form the integrated end-bus plate 100A. In view of such alternative mode, the conducting surface 101A increases its surface area by extending its top and bottom to the top side and bottom side of the main plate body 20A respectively, wherein the air inlet manifold 21A, the cooling fluid inlet manifold 22A, the hydrogen inlet manifold 23A, the air outlet manifold 25A, the cooling fluid outlet manifold 26A, and the hydrogen outlet manifold 27A are formed at the four corner portions 201A of the main plate body 20A while the two electric terminal arms 11A remain protruding from the left and right sides of the main plate body 20A to function as the anode and cathode.

Figure 11:
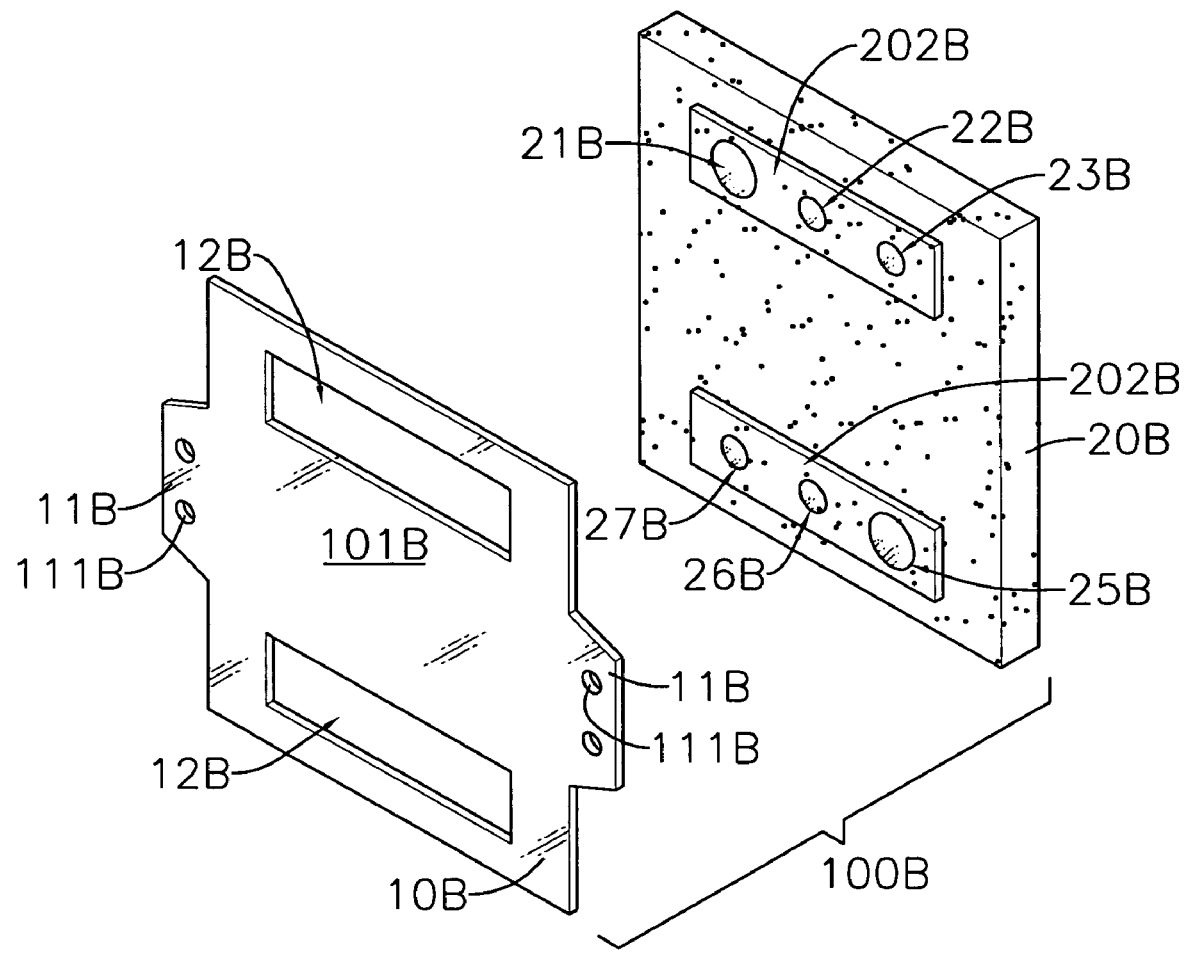
FIG. 11 is an elevation view of an integrated end-bus plate according to a second alternative mode of the above preferred embodiment of the present invention.
Figure 12:
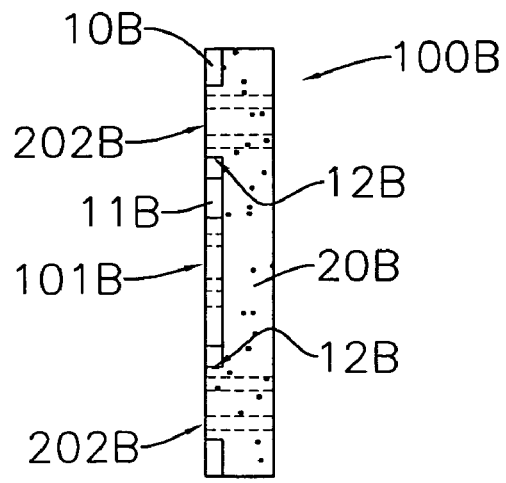
FIG. 12 is an end view of the integrated end-bus plate according to the second alterative mode of the above preferred embodiment of the present invention.

Referring to FIGS. 11 and 12, a second alternative mode of the preferred embodiment of the present invention is illustrated, wherein the main plate body 20B has two manifold base 202B protruded from an upper portion and a lower portion of an inner surface thereof respectively, wherein the air inlet manifold 21B, the cooling fluid inlet manifold 22B, the hydrogen inlet manifold 23B, the air outlet manifold 25B, the cooling fluid outlet manifold 26B, and the hydrogen outlet manifold 27B are respectively formed on the upper and lower manifold bases 202B and extended through the main plate body 20B.

The thickness of each of the manifold bases 202B is equal to the thickness of the conducting plate 10B which has an upper and a lower manifold slot 12B shaped and sized with respect to the manifold bases 202B so that when the conducting plate 10B is attached to the inner surface of the main plate body 20B to form the integrated end-bus plate 100B, the two manifold bases 202B are fittingly inserted in the two manifold slots 12B.

Also, the two electric terminal arms 111B, each having one or more connection holes 111B therethrough, are protruded from two sides of the conducting plate 10B to function as an anode and a cathode of an external electric circuit and output electric current from the fuel cell units 31 stacked in series or parallel manner to construct the external electric circuit, as shown in FIG. 15. Almost the entire surface area of the conducting plate 10B forms the conducting surface 101B, wherein the two manifold bases 202B are extended from the inner surface of the main plate body 20B while the contacting surfaces 201B of the manifold bases 202B and the conducting surface 101B of the conducting plate 10B are on the same plane.

Similarly, the conducting plate 10B embedded in the receiving groove 202B of the main plate body 20B has no manifold formed therein. Therefore, no fluid is required to flow through the conducting plate 10B which functions as the bus plate of the conventional fuel cell stack so that no leakage will happen to the integrated end-bus plate 100B of the present invention. Also, the manifolds 21B, 22B, 23B, 25B, 26B, 27B are formed on the upper and bottom manifold bases 202B of the main plate body 20B and functioned for manifolds extendibility while the entire conducting plate 10B except the manifold slots 12B is functioned for electrical current conductibility. Since no fluid will flow and in contact with the conducting plate 10B, the integrated end-bus plate 100B of the present invention does not need to provide any sealing means to be positioned between the bus plate and the end plate like the conventional fuel cell stack.

Figure 13:
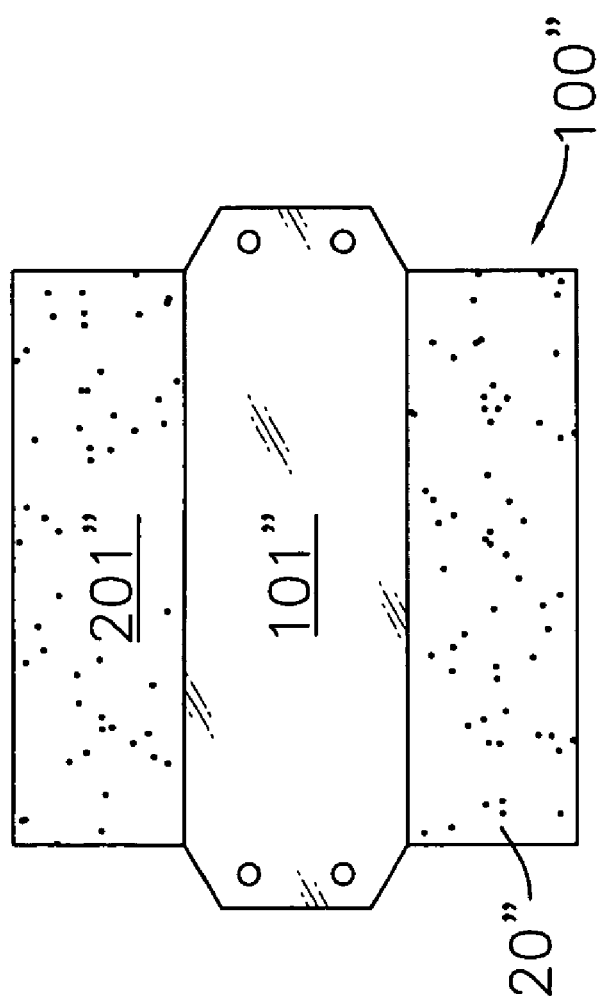
FIG. 13 is an elevation view of an integrated end-bus plate adapted for use as rear plate of a fuel cell stack according to the above preferred embodiment of the present invention.

Referring to FIGS. 13 and 14, when the integrated end-bus plate 100, 101A, 100B is used to replace the bus plate and the rear end plate of the conventional fuel cell stack, the main plate body 20" can be made to provide no manifold therein. Similarly, the integrated end-bus plate 100" as shown in FIGS. 13 and 14 for use as a rear plate of the fuel cell stack can be made by positioning the conducting plate 10" in an injection mold and epoxy resin is injected into the mold to form the main plate body 20". After solidifying, the contacting surface 201" of the main plate body 20" is ground to have the same plane with the conducting surface 101" of the conducting plate 10".

According to the present invention, the process of making the integrated end-bus plate comprises the steps of:

(a) providing a conducting plate made of electro-conducting material such as aluminum, copper, zinc, titanium, and etc. or metallic material electroplated with good electro-conducting noble metal such as gold and platinum;

(b) embedding the conducting plate on an inner surface of a main plate body made of corrosion resistant and non-conducting material, such as plastic, epoxy resin, glass and etc.;

(c) providing an inner contacting surface of the main plate body and an inner conducting surface of the conducting plate on the same plane to form the integrated end-bus plate.

The step (a) may further comprise an additional step of forming a plurality of manifolds around the conducting plate embedded on the main plate groove for directing coolant, fuel and oxidant flowing therethrough.

The step (b) may further comprise the steps of:

(i) forming a receiving groove on the inner surface of the main plate body to embed the conducting plate therein;

(ii) applying adhesive, such as epoxy adhesive, on an attaching surface of the conducting plate; and (iii) solidifying the epoxy adhesive to integrally adhere the conducting plate in the receiving groove.

Alternatively, the step (b) may also comprise the steps of:

(i) placing the conducting plate in an injection mold;

(ii) injecting a predetermined volume of liquid form electrical non-conducting material, such as epoxy resin, into the injection mold to form the main plate body embedded with the conducting plate to form an integral body; and (iii) removing the integral body from the injection mold.

In view of the above description, the integrated end-bus plate for fuel cell stack of the present invention can substantially achieve the following advantages:

(1) The integrated end-bus plate overcomes the conventional drawbacks such as the fluid leaking between the end plate and the bus plate and the formation of metallic ions due to the electrochemical corrosion of the bus plate that generally results in causing damages to the fuel cell.

(2) The integrated end-bus plate functions as a bus plate to output electric current and an end plate to support the fuel cell units and accommodating the manifolds at the same time in one body. Therefore, no end plate is required to construct the fuel cell stack.

(3) No sealing means, which is conventionally provided between the end plate and the bus plate, is required as in the conventional fuel cell stack.

One skilled in the art will understand that the embodiment of the present invention as shown in the drawings and described above is exemplary only and not intended to be limiting.

It will thus be seen that the objects of the present invention have been fully and effectively accomplished. It embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. An integrated end-bus plate for a fuel cell stack having one or more fuel cell units each having a reaction region on each side thereof, wherein said integrated end-bus plate comprises:

a main plate body, which is made of corrosion resistant and electrical non-conducting material, having an outer side, an inner side having at least a contacting surface adapted for being flatly in contact with one side of the fuel cell unit attached adjacent to said main plate body, and a receiving groove which is indented in a middle portion and extended from one end to another end of said inner side thereof, wherein said main plate body provides one or more manifolds extended from said outer side to said contacting surface of said inner side of said main plate body; and a conducting plate, which is made of electro-conducting material, being integrally attached to said inner side of said main plate body to form an integrated body for electrically communicating with the reaction region of the fuel cell unit positioned adjacent to said main plate body while said contacting surface of said main plate body remains in contact with the respective adjacent fuel cell unit, wherein said conducting plate is embedded in said receiving groove providing a conducting surface facing out, wherein said contacting surface of said main plate body and said conducting surface of said conducting plate are on the same plane.

2. The integrated end-bus plate, as recited in claim 1, wherein said manifolds are divided into two sets provided at an upper portion above said receiving groove and a lower portion below said receiving groove of said main plate body respectively.

3. The integrated end-bus plate, as recited in claim 1, wherein said manifolds are formed at corner portions of said main plate body.

4. The integrated end-bus plate, as recited in claim 1, wherein said main plate body has one or more manifold bases protruded from said contacting surface and said manifolds are formed in said manifold bases and extended therethrough, wherein said conducting plate has a conducting surface facing outside and one or more manifold slots provided therethrough, wherein said manifold slots are shaped and sized to enable said manifold bases of the main plate body to insert therein when said conducting plate is integrally attached to said contacting surface of said main plate body, wherein said conducting surface of said conducting plate and said contacting surface of said main plate body are on the same plane.

5. The integrated end-bus plate, as recited in claim 2, wherein said manifolds include an oxidant inlet manifold, said coolant inlet manifold, a fuel inlet manifold, an oxidant outlet manifold, a coolant outlet manifold, and a fuel outlet manifold.

6. The integrated end-bus plate, as recited in claim 3, wherein said manifolds include an oxidant inlet manifold, said coolant inlet manifold, a fuel inlet manifold, an oxidant outlet manifold, a coolant outlet manifold, and a fuel outlet manifold.

7. The integrated end-bus plate, as recited in claim 4, wherein said manifolds include an oxidant inlet manifold, said coolant inlet manifold, a fuel inlet manifold, an oxidant outlet manifold, a coolant outlet manifold, and a fuel outlet manifold.

8. The integrated end-bus plate, as recited in claim 1, wherein said conducting plate, which has a corresponding size with respect to said receiving groove of said main plate body, further comprises one or more electric terminal arms extended outwardly from two ends thereof for functioning as an anode and a cathode of an external electric circuit and output electric current from the fuel cell units stacked to construct an external electric circuit.

9. The integrated end-bus plate, as recited in claim 1, wherein said conducting plate further comprises one or more electric terminal arms extended outwardly from two ends thereof for functioning as an anode and a cathode of an external electric circuit and output electric current from the fuel cell units stacked to construct an external electric circuit.

10. The integrated end-bus plate, as recited in claim 2, wherein said conducting plate further comprises one or more electric terminal arms extended outwardly from two ends thereof for functioning as an anode and a cathode of an external electric circuit and output electric current from the fuel cell units stacked to construct an external electric circuit.

11. The integrated end-bus plate, as recited in claim 3, wherein said conducting plate further comprises one or more electric terminal arms extended outwardly from two ends thereof for functioning as an anode and a cathode of an external electric circuit and output electric current from the fuel cell units stacked to construct an external electric circuit.

12. The integrated end-bus plate, as recited in claim 4, wherein said conducting plate further comprises one or more electric terminal arms extended outwardly from two ends thereof for functioning as an anode and a cathode of an external electric circuit and output electric current from the fuel cell units stacked to construct an external electric circuit.

13. The integrated end-bus plate, as recited in claim 2, wherein said conducting plate and said receiving groove are in hexagonal shape so as to increase said conducting surface by extending a top and a bottom thereof to a top side and a bottom side of said main plate body respectively.

14. The integrated end-bus plate, as recited in claim 4, wherein said conducting plate and said receiving groove are in hexagonal shape so as to increase said conducting surface by extending a top and a bottom thereof to a top side and a bottom side of said main plate body respectively.

15. The integrated end-bus plate, as recited in claim 8, wherein said conducting plate and said receiving groove are in hexagonal shape so as to increase said conducting surface by extending a top and a bottom thereof to a top side and a bottom side of said main plate body respectively.

16. The integrated end-bus plate, as recited in claim 12, wherein said conducting plate and said receiving groove are in hexagonal shape so as to increase said conducting surface by extending a top and a bottom thereof to a top side and a bottom side of said main plate body respectively.

* * * * *